US008902385B2

(12) United States Patent
Liu

(10) Patent No.: US 8,902,385 B2
(45) Date of Patent: Dec. 2, 2014

(54) POLYMER FILM WITHOUT CHOLESTERIC LIQUID CRYSTAL, POLYMER FILM AND REFLECTIVE DISPLAY MODULE

(75) Inventor: Jui-Hsiang Liu, Tainan (TW)

(73) Assignee: National Cheng Kung University, Tainan (TW)

( * ) Notice: Subject to any disclaimer, the term of this patent is extended or adjusted under 35 U.S.C. 154(b) by 600 days.

(21) Appl. No.: 13/049,292

(22) Filed: Mar. 16, 2011

(65) Prior Publication Data

US 2012/0050650 A1 Mar. 1, 2012

(30) Foreign Application Priority Data

Aug. 25, 2010 (TW) .............................. 99128547 A

(51) Int. Cl.
G02F 1/1335 (2006.01)
G02B 1/00 (2006.01)
C09K 19/58 (2006.01)

(52) U.S. Cl.
CPC ......... *C09K 19/586* (2013.01); *G02F 1/133514* (2013.01); *Y02E 10/52* (2013.01); *G02B 1/005* (2013.01)
USPC ........................................................ 349/106

(58) Field of Classification Search
CPC ............... G02F 1/1313; G02F 1/1306; G02F 1/133514; C09K 19/586; G02B 1/005; Y02E 10/52
USPC ............... 349/86, 88, 89, 176, 183, 106, 113; 252/299.01; 428/156, 212, 411.1
See application file for complete search history.

(56) References Cited

U.S. PATENT DOCUMENTS

| 5,364,557 | A | * | 11/1994 | Faris ........................ 252/299.01 |
| 6,106,743 | A | * | 8/2000 | Fan ................................ 252/582 |
| 8,422,848 | B2 | * | 4/2013 | Lee et al. ....................... 385/147 |
| 2003/0106487 | A1 | * | 6/2003 | Huang ............................. 117/68 |
| 2008/0130111 | A1 | | 6/2008 | Cheng et al. |
| 2008/0253411 | A1 | * | 10/2008 | McPhail et al. ................. 372/26 |
| 2009/0126789 | A1 | * | 5/2009 | Li et al. ......................... 136/256 |

FOREIGN PATENT DOCUMENTS

| CN | 101187728 A | 5/2008 |
| CN | 101369029 A | 2/2009 |
| JP | 05029641 A | 2/1993 |
| JP | 1998 096914 | 4/1998 |
| JP | 2001142065 A | 5/2001 |
| JP | 2002 212561 | 7/2002 |
| JP | 2003043460 A | 2/2003 |
| JP | 2003 207776 | 7/2003 |
| JP | 2004 505299 | 2/2004 |

(Continued)

*Primary Examiner* — Dung Nguyen
*Assistant Examiner* — Tai Duong
(74) *Attorney, Agent, or Firm* — Muncy, Geissler, Olds & Lowe, P.C.

(57) ABSTRACT

A polymer film without cholesteric liquid crystal (LC) is characterized in that the polymer film has photonic crystal structure. The polymer film is an innovative product in the feature of having photonic crystal structure without containing cholesteric LC. In addition, the polymer film can further contain fluid which is filled in the film body of the polymer film. By filling any of various fluids in the film body, the light of different wavelengths can be reflected by the polymer film based on Bragg reflection, so that the applications of the polymer film can be broadened. Especially when the fluid is anisotropic liquid, the polymer film can be applied to electro-controlled reflective display modules. In addition, stacking the imprinted polymer films manufactured from left-handed and right-handed cholesteric liquid crystals can improve the brightness of reflected light.

13 Claims, 12 Drawing Sheets

(56) References Cited

FOREIGN PATENT DOCUMENTS

| JP | 2005202093 A | 7/2005 |
| JP | 2010 085532 | 4/2010 |
| JP | 2010-181743 | * 8/2010 |
| WO | WO 2009/050448 | * 4/2009 |
| WO | WO 2010/096936 | * 9/2010 |

* cited by examiner

POLYMER FILM WITHOUT CHOLESTERIC LIQUID CRYSTAL, POLYMER FILM AND REFLECTIVE DISPLAY MODULE

CROSS REFERENCE TO RELATED APPLICATIONS

This Non-provisional application claims priority under 35 U.S.C. §119(a) on Patent Application No(s). 099128547 filed in Taiwan, Republic of China on Aug. 25, 2010, the entire contents of which are hereby incorporated by reference.

BACKGROUND OF THE INVENTION

1. Field of Invention

The present invention relates to an optical crystal polymer film and, in particular, to a polymer film without cholesteric liquid crystal, a polymer film, and a reflective display module.

2. Related Art

After the progressive and development of flat panel display (FPD) devices, the FPD devices have gradually replaced the traditional CRT (Cathode Ray Tube) display devices because of their superior properties of lighter, thinner, low power consumption, and no irradiation. Moreover, the FPD devices are now applied to various kinds of electronic products. The cholesteric liquid crystal is a typical material used in the display technology such as the bi-stable display (e.g. electronic paper).

FIG. 1 is a schematic diagram showing the molecular arrangement of the cholesteric liquid crystal 11, which can be the chiral cholesteric liquid crystal or achiral cholesteric liquid crystal doped with chiral compounds. The cholesteric liquid crystal molecule typically has a chiral center. Thus, the liquid crystal molecules can be stacked in parallel and arranged in layers. The liquid crystal layers are in parallel to each other, and the liquid crystal molecules of each layer are aligned in the same direction. The lengthwise axle of the liquid crystal molecules is in parallel to the surface of the layer. In addition, the lengthwise axles of liquid crystal molecules in every adjacent two layers are regularly rotated with a certain angle, so that the stacked layers can form a spiral structure. When the stacked layers are totally rotated for 360 degrees, the direction the lengthwise axle of liquid crystal molecules comes back to the initial direction, which defines a pitch P. The liquid crystal molecules with the above-mentioned spiral structure can polarize the inputted light and then emit a light with a specific wavelength. In addition, the pitch can determine the wavelength of the strongest reflective light.

FIG. 2 and FIG. 3 are schematic diagrams showing the molecule arrangements of the cholesteric liquid crystal. As shown in FIG. 2, the cholesteric liquid crystal 11 is sandwiched between two glass substrates 12 and 13, a black absorption layer 14 is configured at the bottom. When the electronic field is not applied, the cholesteric liquid crystal 11 forms a planar texture. Since the spiral period (pitch) is roughly the same as the wavelength of light, the above-mentioned periodical structure can induce the Bragg reflection for the light of specific wavelength. The peak of the reflected light is $\lambda=nP$, wherein n is the average refractive index. In general, this reflection feature can be applied to the optical components and liquid crystal displays. FIG. 3 further illustrates the alignment of the focal-conic cholesteric liquid crystal.

Currently, the optical film with the Bragg reflection feature can be designed and manufactured with the cholesteric liquid crystal. For example, it may include the pure cholesteric liquid crystal film or the polymer film doped with the cholesteric liquid crystal.

In the polymer stabilized cholesteric liquid crystal, a few amount of monomer (less than 20%) can be added, so that the monomer can be distributed in the cholesteric liquid crystal, thereby forming the stabilized planar texture and achieving the Bragg reflection effect. However, the cholesteric liquid crystal is a very expensive material, so the manufacturing cost increases. This is the reason why the cholesteric liquid crystal can not be widely used.

Therefore, it is an important subject of the present invention to provide a novel polymer film, which has the photonic crystal structure without using the expansive cholesteric liquid crystal. Moreover, the polymer film may have the Bragg reflection effect without containing any of liquid crystal or fluid. Thus, the manufacturing cost thereof can be sufficiently reduced, and the application fields thereof can be broadened.

SUMMARY OF THE INVENTION

In view of the foregoing subject, the present invention is to provide a novel polymer film, which has the photonic crystal structure without using the expansive cholesteric liquid crystal. Moreover, the polymer film may have the Bragg reflection effect without containing any of liquid crystal or fluid. Thus, the manufacturing cost thereof can be sufficiently reduced, and the application fields thereof can be broadened.

To achieve the above objective, the present invention discloses a polymer film without cholesteric liquid crystal (LC), which is characterized in that the polymer film has photonic crystal structure.

To achieve the above objective, the present also discloses a polymer film including a film body and a fluid. The film body has photonic crystal structure, and the fluid is filled in the film body. The fluid can be air, monomer, or any other isotropic or anisotropic material.

To achieve the above objective, the present invention further discloses a reflective display module including a polymer film having photonic crystal structure and a driving circuit. The polymer film includes a film body and an anisotropic liquid. The film body has photonic crystal structure, and the anisotropic liquid is filled in the film body. The driving circuit drives the anisotropic liquid.

In one embodiment, the photonic crystal structure is a cholesteric LC structure, and it can be formed by imprinting cholesteric liquid crystal or a mixture composed of achiral liquid crystal and chiral dopant. In this embodiment, although the liquid crystal is needed in the manufacturing processes, the expansive cholesteric liquid crystal is not contained in the final product. Thus, the manufacturing cost of the polymer film can be sufficiently decreased.

In one embodiment, the polymer film includes at least two areas having different pitches and/or refraction indexes. Accordingly, the polymer film can generate the reflective light of different wavelengths, thereby broadening the application thereof. For example, according to the above feature, the polymer film of the embodiment can generate the reflective light of three primary colors (e.g. RGB colors), so that it can be applied to the reflective display module for displaying static or dynamic color images. For example, it can be designed in the color pattern appearance of color image recorder or solar cell.

In one embodiment, the fluid is gas or liquid, such as an isotropic liquid or an anisotropic liquid. For example, the isotropic liquid is a solvent, a monomer, or their combination, and the anisotropic liquid is a liquid crystal. If the fluid is an anisotropic liquid, the electric field can be applied to drive the anisotropic liquid so as to carry out the display function. In the display module, the liquid (e.g. liquid crystal) to be filled in the polymer film can be sufficiently reduced. The display module is, for example, an e-paper, a displayer, an outdoor media board, an advertising board.

In one embodiment, the polymer film can be configured in a solar cell element. Since the wavelength of the reflected light can be controlled, the polymer film of the present invention can be applied to the surface color design of the solar cell. In this case, the light of a specific wavelength for the solar cell passes through the polymer film, and the visible light of other wavelengths are reflected. This feature can be used to design the appearance color pattern of the solar cell. This design provides the solar cell with colorful appearance instead of the conventional black one.

In one embodiment, the polymer film can be configured in a backlight module to be a brightness enhancement film.

In one embodiment, the polymer film can connect with a light-permeable element, such as glass or polymer film (e.g. release paper or plastic film). By using different intermedia to connect with the polymer film, the polymer film can be applied to different fields. For example, if the polymer film is disposed on glass, it can be applied to a displayer. If the polymer film is disposed on another polymer film, it can be directly attached to the position for displaying by adhering. Otherwise, if the polymer film is disposed on a release paper, it can be ready for selling to the down-stream factory.

To achieve the above objective, the present invention also discloses a multilayer structure optical film including a plurality of polymer films. The polymer films are manufactured from imprinting left-handed and right-handed cholesteric liquid crystals respectively. Accordingly, the brightness of the reflected light of the polymer film can be enhanced. If only the left-handed or right-handed cholesteric liquid crystal is used for imprinting, only half of the incident light (50%) can be reflected. Therefore, if the polymer films formed by utilizing the left-handed cholesteric liquid crystal and the right-handed cholesteric liquid crystal are stacked to form the optical film, the optical film can provide full reflection (100%). In addition, other conventional technologies (e.g. the polymerization) can be used to manufacture the polymer film with various patches, so that the reflection can be applied to all visible light (400 nm to 800 nm).

In summary, the present invention discloses a novel polymer film, which has the photonic crystal structure without using the expansive cholesteric liquid crystal. Moreover, the polymer film may have the Bragg reflection effect without containing any of liquid crystal or fluid. Thus, the manufacturing cost thereof can be sufficiently reduced, and the application fields thereof can be broadened. In addition, the polymer film of the present invention may further contain a fluid filled in the film body of the polymer film. By filling any of various fluids with different refraction indexes, the light of different wavelengths can be reflected by the polymer film based on Bragg reflection, so that the applications of the polymer film can be broadened. When the fluid is anisotropic liquid, the polymer film can be applied to reflective display modules. In addition, the polymer film includes at least two areas having different pitches and/or refraction indexes, so that the color pixels and their sub-pixels of the polymer film can be provided. Accordingly, the color display can be achieved. Moreover, the polymer film of the present invention is equipped with the functions of the color filter layer and liquid crystal layer of the conventional LCD module, so that the display module using the polymer film of the present invention can be lighter and thinner, and have lower cost.

Furthermore, the display module using the polymer film of the present invention can be flexible. Besides, the polymer film of the present invention has the photonic crystal structure without containing the expensive cholesteric liquid crystal, so that the manufacturing cost thereof can be sufficiently reduced.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
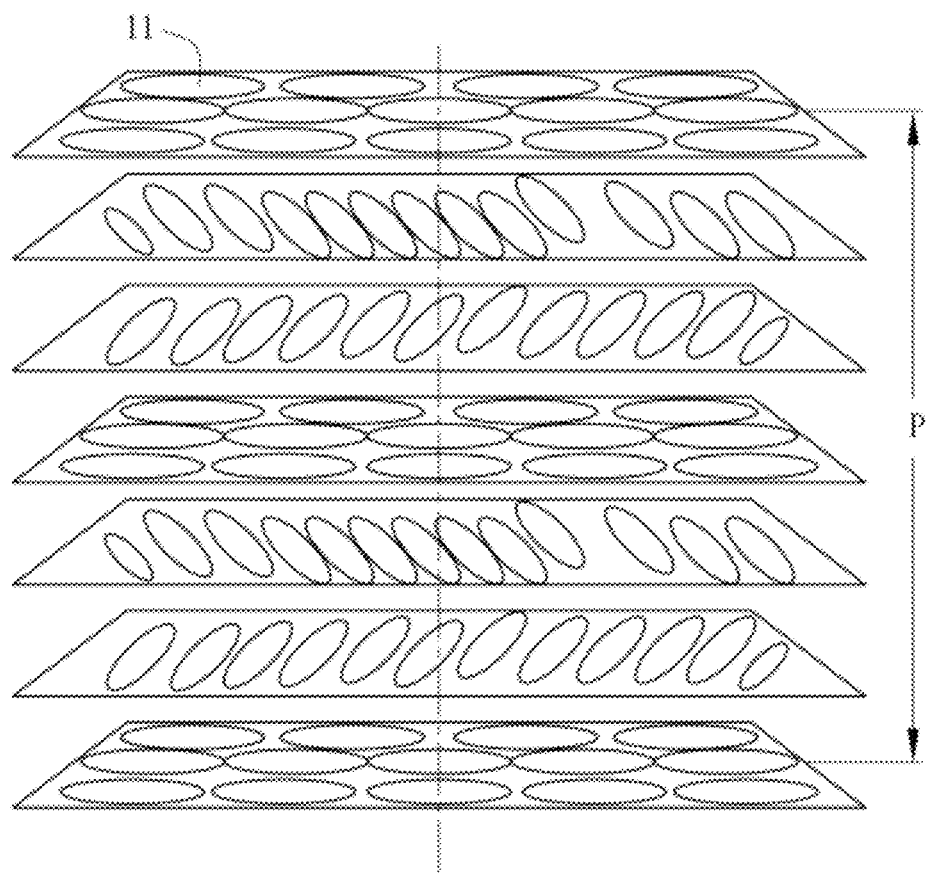
FIG. 1 is a schematic diagram showing the molecule alignment of the cholesteric liquid crystal.
Figure 2:
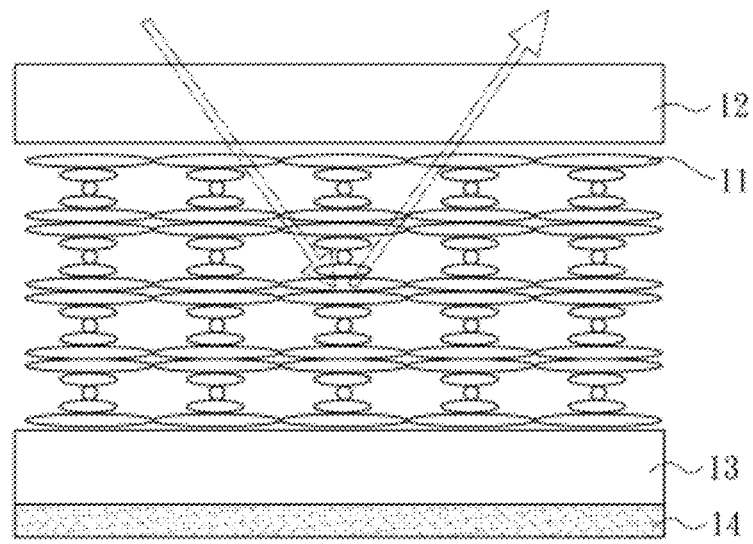
FIG. 2 is a schematic diagram showing the cholesteric liquid crystal with planar texture alignment and having the property of Bragg reflection.
Figure 3:
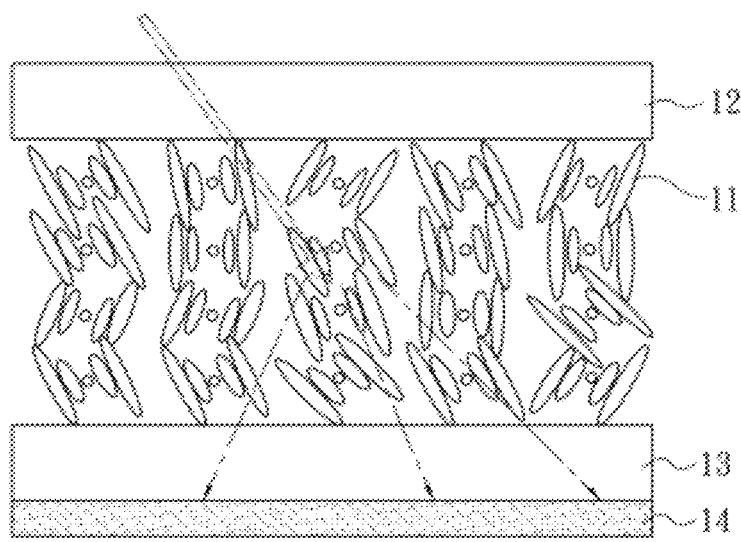
FIG. 3 is a schematic diagram showing the cholesteric liquid crystal with focal-conic alignment.
Figure 4:
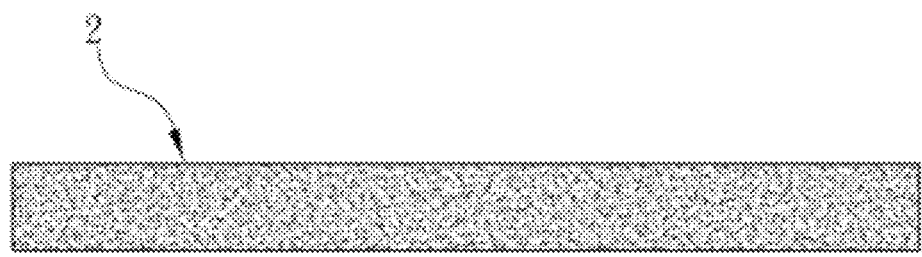
FIG. 4 is a schematic diagram showing a polymer film with photonic crystal structure according to an embodiment of the present invention.

With reference to FIG. 4, a polymer film 2 according to an embodiment of the present invention has the photonic crystal structure. The photonic crystal structure is, for example, a cholesteric liquid crystal structure, so that the polymer film 2 has the property of Bragg reflection. The cholesteric liquid crystal structure can be formed by imprinting cholesteric liquid crystal or a mixture composed of achiral liquid crystal and chiral dopant. Since the expansive cholesteric liquid crystal is not contained in the final product, the manufacturing cost of the polymer film can be sufficiently decreased.

Figure 5:
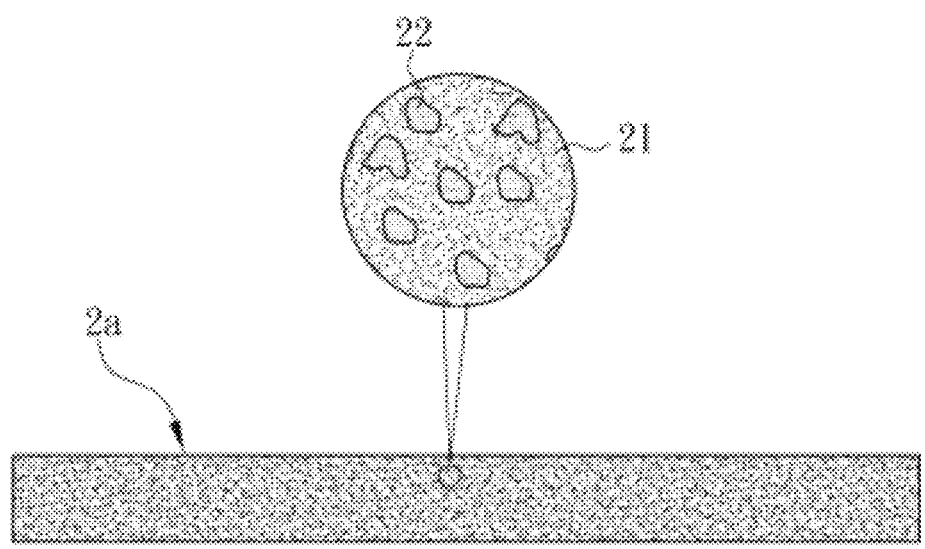
FIG. 5 is a schematic diagram of filling the fluid to the polymer film with photonic crystal structure according to the embodiment of the present invention.

Referring to FIG. 5, another polymer film 2a according to the embodiment of the present invention includes a film body 21 and a fluid 22 filled in the film body 21. The fluid can be gas or liquid. By filling the fluid 22 in the film body 21, the light reflective wavelength of the film body 21 can be changed. In this case, the liquid can be isotropic liquid or anisotropic liquid. For example, the isotropic liquid is a solvent, a monomer, or their combination, and the anisotropic liquid is a liquid crystal. If the liquid is a monomer, it can be polymerized. For example, when the monomer is exposed to light, the polymerization reaction is induced to form solid polymer. Thus, it is unnecessary to seal the liquid, and the stability and utility of the polymer film can be improved. If the fluid is an anisotropic liquid, an electric field can be applied to control the anisotropic liquid molecules to achieve the display function. Alternatively, it is also possible to utilize the refraction index variation, which is provided when the anisotropic liquid immigrates to the isotropic liquid due to the temperature, so as to achieve the reflective color change. This can applied to the design of thermo-sensitive pattern. Of course, a heater can be used to control the reflective color change. In the display module using the polymer film, the liquid to be filled, such as liquid crystal, can be sufficiently decreased. The display module can be, for example, an e-paper, a displayer, an outdoor media board, an advertising board. Besides, the polymer film of the present invention is equipped with the functions of the color filter layer and liquid crystal layer of the conventional LCD module, so that the display module using the polymer film of the present invention can be lighter and thinner, and have lower cost. Furthermore, the display module using the polymer film of the present invention can be flexible.

Figure 6A:
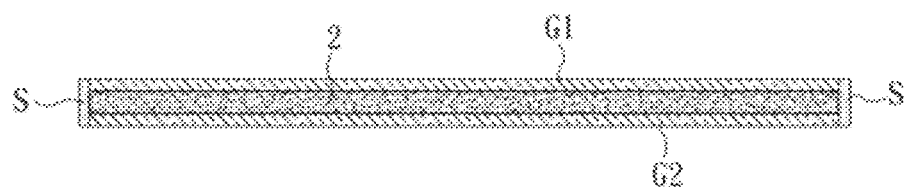
FIGS. 6A to 6C are schematic diagrams showing the polymer film according to the embodiment of the present invention connecting to the light-permeable elements.
Figure 6B:
Figure 6C:

The above-mentioned polymer film 2 or 2a may further connect to a light-permeable element for broadening its application. The light-permeable element is, for example, glass or polymer film (e.g. release paper or plastic film). By using different intermedia to connect with the polymer film, the polymer film can be applied to different fields. For example, if the polymer film is disposed on glass, it can be applied to a display module. If the polymer film is disposed on another polymer film, it can be directly attached to the position for displaying by adhering. Otherwise, if the polymer film is disposed on a release paper, it can be ready for selling to the down-stream factory. As shown in FIG. 6A, the polymer film 2 (2a) is disposed between two glass substrates G1 and G2, and a sealing material S is disposed around the polymer film 2 (2a) to sealing it. As shown in FIG. 6B, the polymer film 2 (2a) is connected to another polymer film PF1. As shown in FIG. 6C, the polymer film 2 (2a) is connected to and covered by a polymer film PF2. To be noted, the above-mentioned connections of the polymer film and the light-permeable element are for illustrations only and are not for limiting the scope of the present invention.

Figure 14:
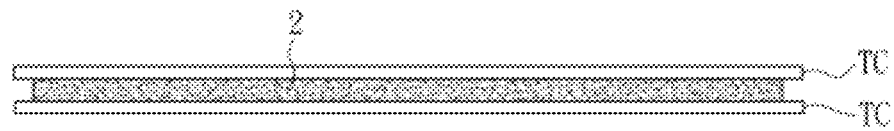
FIG. 14 is a schematic diagram showing the transparent conductive films attached to two sides of the polymer film.
Figure 15:
FIG. 15 is a schematic diagram showing a plurality of stacked polymer films.
Figure 16:
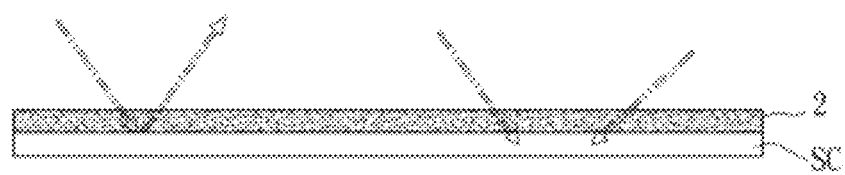
FIG. 16 is a schematic diagram showing the polymer film configured in a solar cell element.

FIGS. 14 to 16 show various aspects of the polymer film according to the embodiment of the present invention.

As shown in FIG. 14, a transparent conductive film TC is attached on one side of the polymer film 2 (2a). In this aspect, two transparent conductive films TC are attached to the top and bottom sides of the polymer film 2, respectively. Of course, if only the top side of the polymer film 2 is the display surface, the conductive film disposed on the bottom side of the polymer film 2 can be opaque. The configuration of the transparent conductive film can control the molecular orientation and refraction index of the fluid (e.g. the anisotropic liquid) in the polymer film so as to change the color of the reflected light.

As shown in FIG. 15, a plurality of polymer films 2 (2a) are stacked to form a multilayer structure polymer film. The polymer films 2 can be formed by utilizing the left-handed cholesteric liquid crystal and the right-handed cholesteric liquid crystal. Accordingly, the brightness of the reflected light of the polymer film can be enhanced. If only the left-handed or right-handed cholesteric liquid crystal is used for imprinting, only half of the incident light (50%) can be reflected. Therefore, if the polymer films formed by utilizing the left-handed cholesteric liquid crystal and the right-handed cholesteric liquid crystal are stacked, the stacked polymer films can form an optical film for providing full reflection (100%).

As shown in FIG. 16, the polymer film 2 (2a) can be disposed on a solar cell element SC. Since the wavelength of the reflected light can be controlled, the polymer film of the present invention can be applied to the surface color design of the solar cell. The light of a specific wavelength for the solar cell passes through the polymer film, and the visible light of other wavelengths are reflected. This feature can be used to design the appearance color pattern of the solar cell. This design provides the solar cell with colorful appearance instead of the conventional black one.

Figure 7:
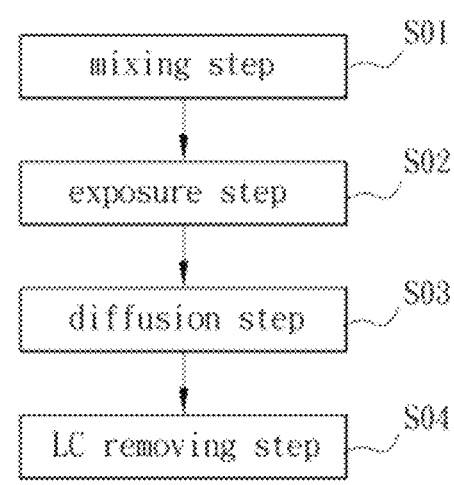
FIG. 7 is a flow chart of the manufacturing method of the polymer film with the photonic crystal structure according to an embodiment of the present invention.
Figure 8:
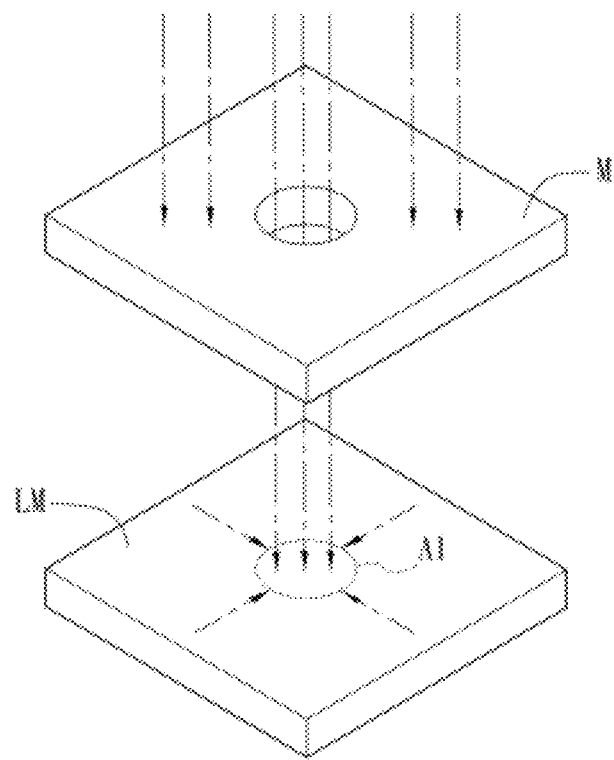
FIG. 8 is a schematic diagram showing the exposure step with utilizing the mask according to the embodiment of the present invention.

The manufacturing method of the polymer film 2 including steps S01 to S04 will be described hereinbelow with reference to FIG. 7.

Step S01: a mixing step for at least mixing an achiral liquid crystal (LC), a chiral dopant, a monomer and a photo initiator together to form an LC-monomer mixture. In the step S01, the achiral LC, the monomer and the photo initiator are well mixed, and then the chiral dopant is added. Finally, the LC-monomer mixture is filled in a light-permeable cell (e.g. a glass container), which has an inner surface treated by the parallel process. In this step, it is also possible to add the cholesteric liquid crystal (without adding the chiral dopant), and then perform the polymerization and the imprinting process of the photonic structure. The glass container can also be selectively replaced by any light-permeable plastic film.

In this embodiment, the achiral liquid crystal is the liquid crystal without chirality, such as the nematic liquid crystal or smectic liquid crystal. The chiral dopant can induce the achiral liquid crystal to generate the spiral alignment and thus provide the chirality to the achiral liquid crystal. The chiral dopant is for example a cyanobiphenyl derivative. The monomer can be a monomer with single, dual functional groups, or their combination. In this embodiment, the monomer is a monomer with dual functional groups for example, and it may have the liquid crystal phase. For example, the monomer is BAHB (4,4'-Bis(6-acryloyoxy-hexyloxy)biphenyl), so that it can achieve the efficient of imprinting the cholesteric structure. The function of the photo initiator is to initiate the photo polymerization reaction of the monomer while the monomer is irradiated by light. Any marketed photo initiator can be adopted in this step.

In the present embodiment, the achiral liquid crystal is between 10% and 80% in weight, and the monomer is between 20% and 90% in weight. In practice, the percentages of the achiral liquid crystal, chiral dopant, monomer and photo initiator in the LC-monomer mixture are 53%, 13%, 33% and 1%. After well mixing under room temperature, the LC-monomer mixture can present the cholesteric liquid crystal phase. To be noted, the increase of the polymerization rate of the monomer (prior art is less than 20%) can raise the imprint rate of chirality of the polymer in the polymer film. Therefore, the polymer film can reveal stronger photonic crystal structure and property of Bragg reflection. Alternatively, this step can also be performed by mixing cholesteric liquid crystal, monomer and initiator, and then filling the mixture to a cell, which is treated by the parallel alignment process.

Step S02: an exposure step for exposing the LC-monomer mixture through a mask. In this embodiment, a UV light (e.g. 254 nm) is used to irradiate the LC-monomer mixture, so that the monomer can have the photo polymerization reaction to form the desired polymer so as to imprint the chirality of the liquid crystal to the polymer. Because the present embodiment uses the cholesteric liquid crystal phase to perform the imprinting, the photonic crystal structure of the polymer film can be the cholesteric liquid crystal structure. FIG. 5 shows the exposure step with utilizing the mask. The UV light can pass through a mask M to selectively expose the LC-monomer mixture LM so as to form an exposure area A1. The pattern of the mask M is not limited in this embodiment.

Step S03: a diffusion step for diffusing the monomer from an area around the exposure area A1 to the exposure area A1. After the exposure step, the monomer in the exposure area has been polymerized to form the polymer. Thus, the concentration of the monomer in the exposure area is less than that in the area around the exposure area, so that the monomer in the area around the exposure area can travel to the exposure area A1 by diffusion for performing the polymerization reaction again. Accordingly, the polymerization rate of the monomer can be increased. In the diffusion step, the LC-monomer mixture can be statically placed for a while, and the LC-monomer mixture should be protected from being irradiated in this period. In addition, the manufacturing method of the present invention may perform several times of the exposure step and the diffusion step to sufficiently increase the polymerization rate of the monomer. Moreover, the different exposure steps can expose the same area or different areas.

Figure 9A:
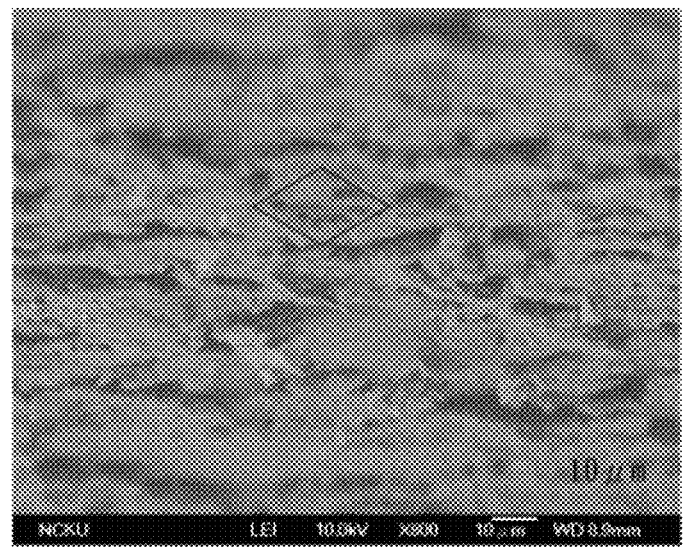
FIG. 9A and FIG. 9B are the SEM images of the cross-section of the polymer film according to the embodiment of the present invention.
Figure 9B:
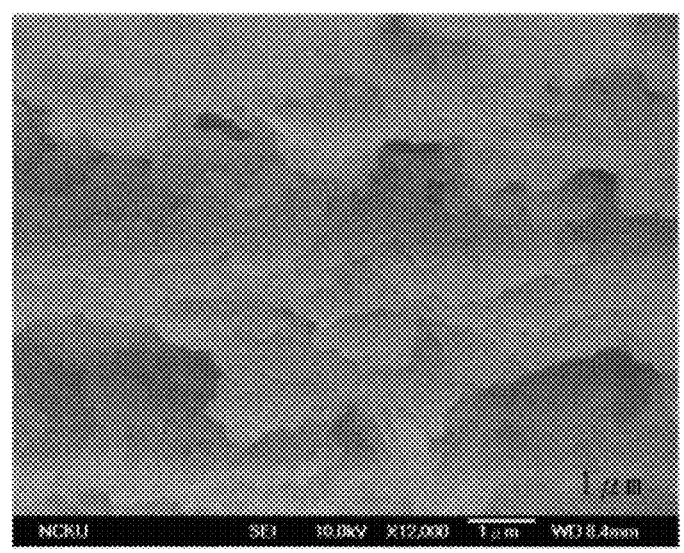

Step S04: a LC removing step for removing the achiral LC to form a polymer film. In the step S04, an organic solvent, such as acetone or chloroform, is used to remove the achiral LC. After the liquid crystal is completely removed from the polymer film, the polymer film is then dried. Since the dual functional groups have a certain durability, the cross-linked monomer becomes insoluble so that the organic solvent can not remove the polymer. In addition, it is also possible to mix the monomer with single function group and the monomer with multiple functional groups to form the cross-linked polymer, which has resistance from solving in solvent. FIG. 9A and FIG. 9B are the SEM images of the cross-section of the polymer film, and FIG. 9B is an enlarged view of the rhombus area in the FIG. 9A. Referring to FIG. 9A and FIG. 9B, the SEM images shows the high conversion structure of the polymer. According to the above-mentioned steps S01 to S04, the polymer film 2 can be manufactured.

Figure 10:
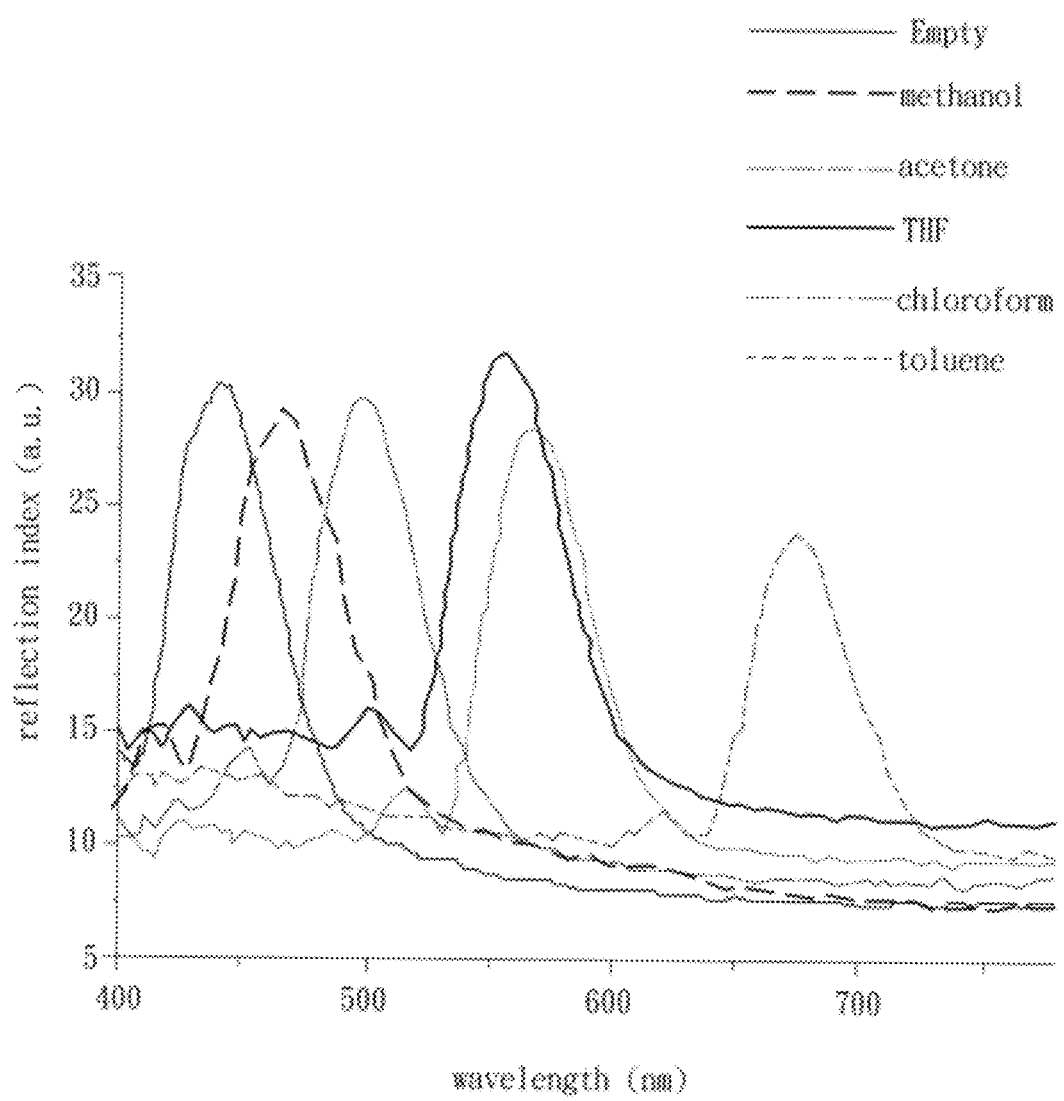
FIG. 10 is a schematic diagram showing the reflection index of the polymer film according to the embodiment of the present invention and filled with different liquids at different wavelengths.

FIG. 10 is a schematic diagram showing the reflection index of the polymer film manufactured after the step S04 at different wavelengths. Even if the polymer film does not contain the liquid crystal molecules or other fluid, it can still have the property of Bragg reflection. In addition, the manufacturing method may further include a filling step for filling a fluid in the polymer film. The fluid can be gas or liquid, such as an isotropic liquid or an anisotropic liquid. For example, the isotropic liquid may be a solvent, and the anisotropic liquid may be a liquid crystal. The solvent is, for example, methanol, acetone, THF (Tetrahydrofuran), chloroform, or toluene. The liquid crystal is, for example, a cholesteric liquid crystal, a nematic liquid crystal, or a smectic liquid crystal.

FIG. 10 shows the reflection rate of the polymer film, which is filled with methanol (refraction index is 1.3284), acetone (refraction index is 1.3586), THF (refraction index is 1.4072), chloroform (refraction index is 1.4458), and toluene (refraction index is 1.4969) respectively, at different wavelengths. Due to the variations of the refraction indexes of the solvents, the wavelengths of the reflected light are different. This phenomenon matches the Bragg reflection principle of $\lambda=nP$, wherein n is the average reflection index.

Figure 11:
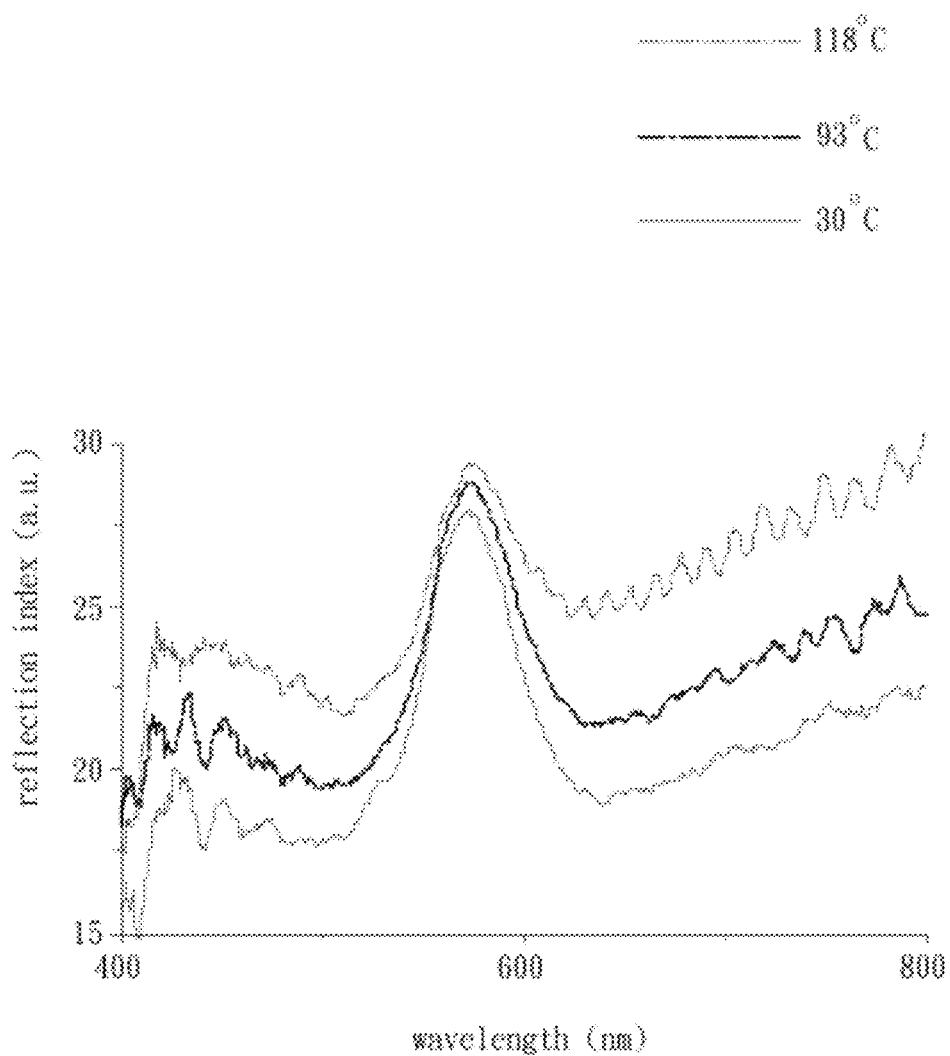
FIG. 11 is a schematic diagram showing the reflection index of the polymer film, which is filled with nematic liquid crystal and heated to different temperatures.

As shown in FIG. 11, when the polymer film filled with the nematic liquid crystal is heated to over the isotropic phase temperature of the liquid crystal (about 90° C.), it can still have stable property of Bragg reflection. This experimental result indicates that the polymer film of the present invention has excellent temperature stability.

In addition, after filling the fluid, the manufacturing method of the polymer film may further include a step of polymerizing the fluid to enhance the stabilization and utility of the polymer film. Herein, it is unnecessary to seal the fluid after the polymerization because the polymerized fluid becomes solid.

In another embodiment, the mixing step of the manufacturing method of the polymer film is for at least mixing a chiral liquid crystal, a monomer and a photo initiator together to form an LC-monomer mixture. In this embodiment, the chiral liquid crystal is directly used to imprint the chirality to the polymer film instead of using the achiral liquid crystal and the chiral dopant.

In another embodiment, the manufacturing method of the polymer film further includes an alignment step for aligning the LC-monomer mixture. For example, the inner surface of the light-permeable container can be processed with parallel alignment process so as to provide desired alignment effect. The parallel alignment process can be performed with polymer, organic or inorganic layer and through the rubbing parallel alignment process. When the LC-monomer mixture is filled or mixed in the light-permeable container, the alignment step can make the LC-monomer mixture to present the planar texture structure. After the alignment, the LC-monomer mixture is exposed to induce the polymerization reaction, and then the following steps as mentioned above are performed.

Figure 12:
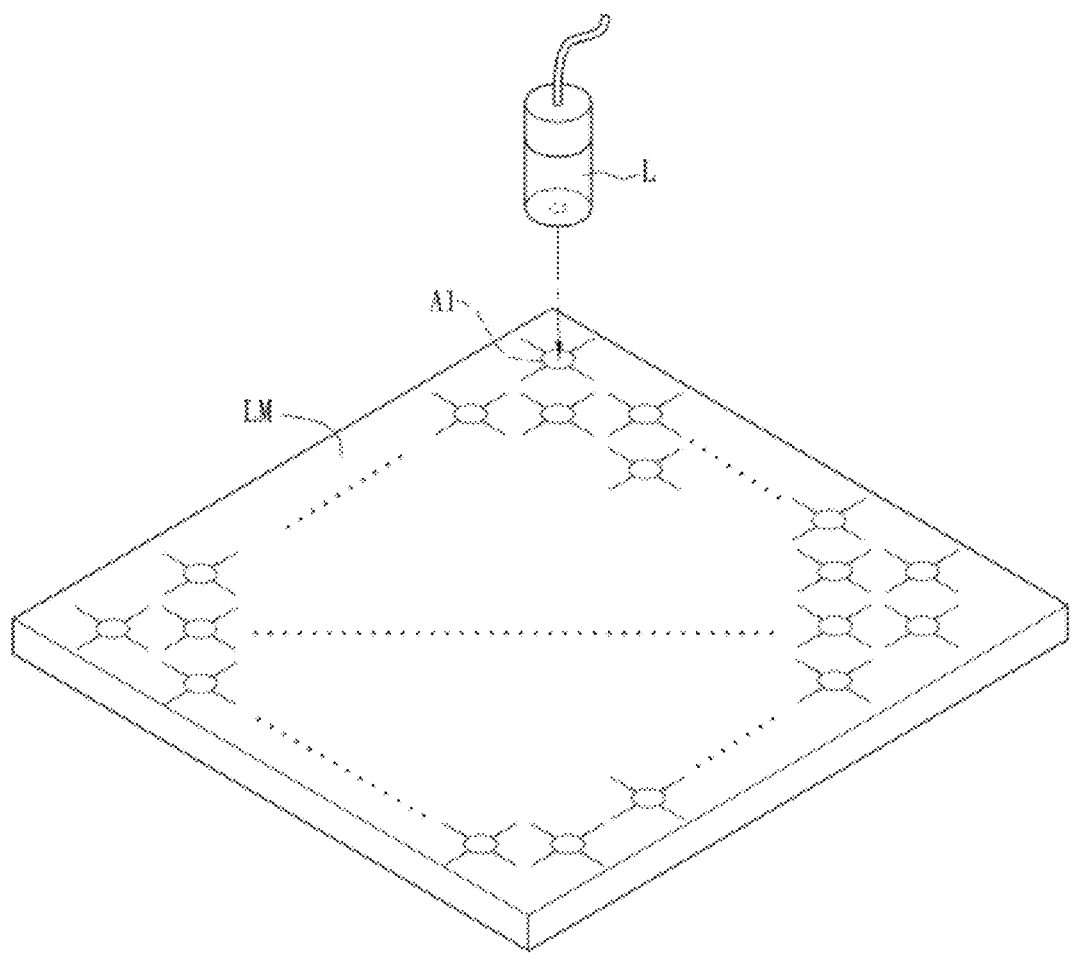
FIG. 12 is a schematic diagram showing the exposure step by the laser according to the embodiment of the present invention.

In another embodiment, the exposure step of the manufacturing method of the polymer film can be modified to use a laser to irradiate at least one exposure area of the LC-monomer mixture. As shown in FIG. 12, a laser head L can emit light to irradiate a plurality of exposure areas A1 (dotted lines areas) of the LC-monomer mixture 2, so that the monomer in the exposure areas A1 may have polymerization reaction to form the polymer. Then, the diffusion step is performed to diffuse the monomer to the exposure areas A1. Of course, it is possible to repeat several times of the exposure step and the diffusion step so as to increase the polymerization rate of the monomer. In the different exposure steps, the laser can irradiate on the same area or different areas. In addition, shapes and the arrangement of the exposure areas A1 are not limited in this embodiment.

In addition, no matter the exposure step is performed by using the mask, laser or their combination, at least two exposure areas of the LC-monomer mixture can have different exposure times, exposure intensities, exposure periods, and diffusion periods. Accordingly, the exposure areas may provide different pitches and/or refractive indexes, so that the Bragg reflection can be applied to the light with different wavelengths. Thus, the application of the polymer film can be broadened. For example, three adjacent exposure areas can respectively reflect three primary colors (e.g. RGB colors).

Figure 13:
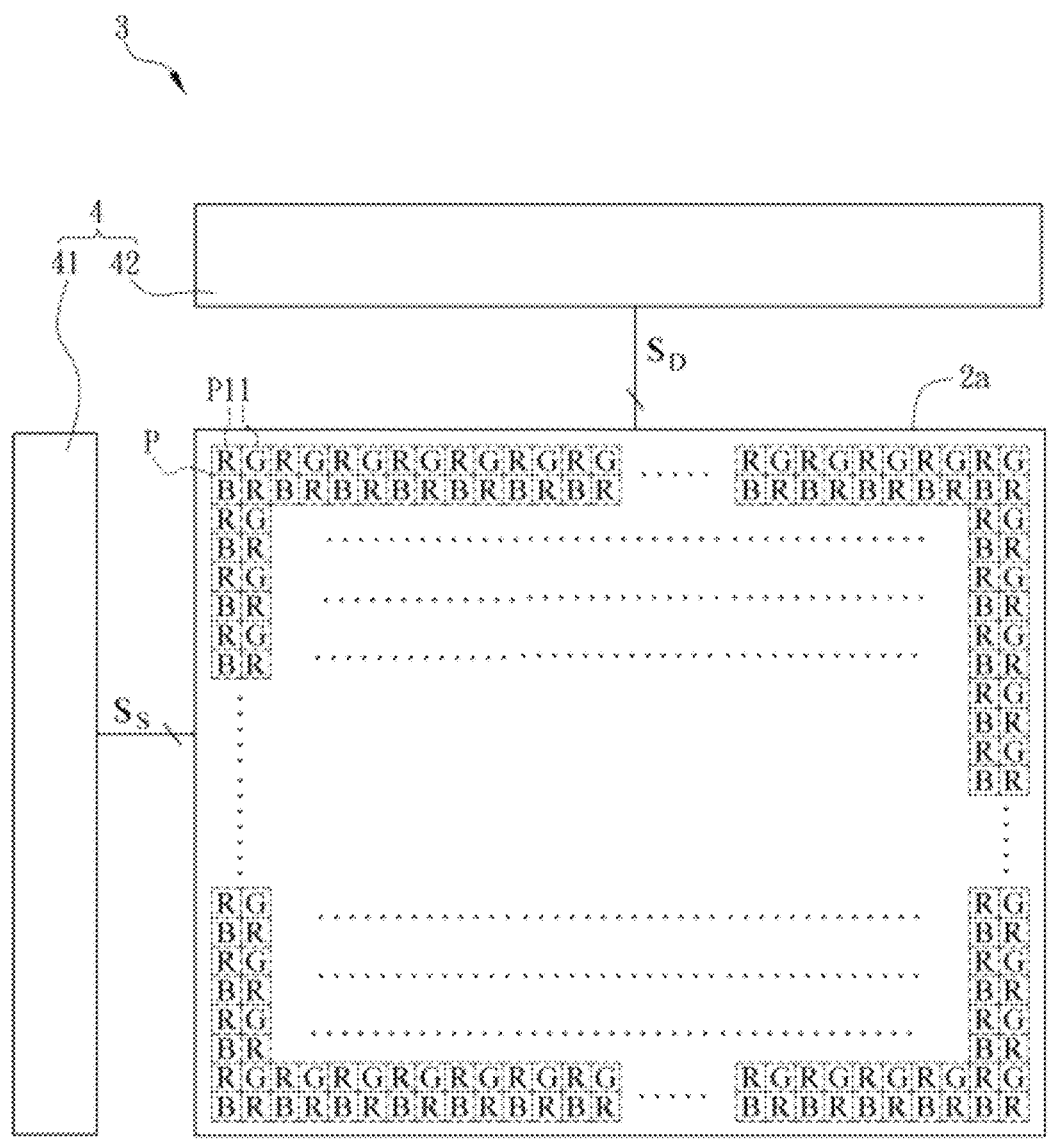
FIG. 13 is a schematic diagram of a reflective display module according to an embodiment of the present invention.

FIG. 13 is a schematic diagram of a reflective display module 3 according to an embodiment of the present invention. The reflective display module 3 includes a polymer film 2a having photonic crystal structure and a driving circuit 4. The polymer film 2a is filled with an anisotropic liquid, which contains chiral liquid crystal (e.g. cholesteric liquid crystal) or achiral liquid crystal (e.g. nematic liquid crystal or smectic liquid crystal). Since the polymer film 2a has been described hereinabove, the detailed description thereof is omitted. The driving circuit 4 drives the anisotropic liquid molecules to rotate so as to control the anisotropic liquid molecules to align toward different alignment direction. This can change the refraction index and the color of the reflected light, thereby achieving the display purpose.

In this embodiment, the polymer film 2a includes a plurality of pixels P, and each pixel P has a plurality of sub-pixels P11. In this case, each pixel P has three sub-pixels P11 for example, and the three sub-pixels P11 are R, G and B sub-pixels for constructing the pixel P. The arrangement of the sub-pixels can be any of the conventional arrangements. The pitches and/or refraction indexes of the sub-pixels P11 are different. Since the light reflection of the polymer film 2 matches the Bragg equation of $\lambda=nP$, wherein n is the average reflection index, the present invention can achieve the display purpose by configuring the sub-pixels of different pitches, different refraction indexes, or different pitches and refraction indexes. For example, the polymer film of the invention can be used to display static or dynamic images, and the display module can be used as the color image recorder. In this embodiment, each pixel has three primary colors, so that it can display various colors to achieve the color display effect.

The sub-pixels P11 may have different refraction indexes and pitches by filling different liquids. In addition, it is also possible to change the pitch and/or refraction index of each sub-pixel P11 by applying different exposure times, exposing the light with different wavelengths and intensities, or performing different diffusion periods.

The driving circuit 4 may include a scan driving circuit 41 and a data driving circuit 42 for driving a TFT (thin-film-transistor) substrate of the polymer film 2. The scan driving circuit 41 transmits scan signals $S_S$ to the TFT substrate to enable the transistors, and the data driving circuit 42 transmits data signals $S_D$ to drive the transistors. Accordingly, the voltage can be applied to control the anisotropic liquid molecules to align toward different alignment directions, thereby achieving the color display purpose.

To be noted, the reflective display module 3 of the present embodiment contains less anisotropic liquid molecules and does not use the cholesteric liquid crystal, so that the manufacturing cost is reduced. In addition, the polymer film 2a is equipped with the functions of the color filter layer and liquid crystal layer of the conventional LCD module, so that the display module using the polymer film of the present invention can be lighter and thinner, and have lower cost. Moreover, the reflective display module 3 of the present invention is flexible.

As mentioned above, the present invention discloses a novel polymer film, which has the photonic crystal structure without using the expansive cholesteric liquid crystal. Moreover, the polymer film may have the Bragg reflection effect without containing any of liquid crystal or fluid. Thus, the manufacturing cost thereof can be sufficiently reduced, and the application fields thereof can be broadened. In addition, the polymer film of the present invention may further contain a fluid filled in the film body of the polymer film. By filling any of various fluids, the light of different wavelengths can be reflected by the polymer film based on Bragg reflection, so that the applications of the polymer film can be broadened. When the fluid is anisotropic liquid, the polymer film can be applied to reflective display modules. In addition, the polymer film includes at least two areas having different pitches and/or refraction indexes, so that the pixels and their sub-pixels of the polymer film can be provided. Accordingly, the color display can be achieved. Moreover, the polymer film of the present invention is equipped with the functions of the color filter layer and liquid crystal layer of the conventional LCD module, so that the display module using the polymer film of the present invention can be lighter and thinner, and have lower cost. Furthermore, the display module using the polymer film of the present invention can be flexible. Besides, the polymer film of the present invention has the photonic crystal structure without containing the expensive cholesteric liquid crystal, so that the manufacturing cost thereof can be sufficiently reduced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A polymer film without cholesteric liquid crystal (LC) is characterized in that the polymer film has photonic crystal structure, wherein the polymer film comprises at least two areas having different pitches, and at least two areas of the polymer film have different refraction indexes.

2. The polymer film according to claim 1, wherein the photonic crystal structure is a cholesteric LC structure.

3. The polymer film according to claim 1, which is connected to a light-permeable element.

4. The polymer film according to claim 1, which is configured in a solar cell element.

5. A multilayer structure optical film comprising a plurality of polymer films of claim 1, wherein the polymer films are manufactured from imprinting left-handed and right-handed cholesteric liquid crystals, and then remove left-handed and right-handed cholesteric liquid crystals.

6. A polymer film, comprising:
   a film body having photonic crystal structure; and
   a fluid filled in the film body;
   wherein the polymer film comprises at least two areas having different pitches, and at least two areas of the polymer film have different refraction indexes.

7. The polymer film according to claim 6, wherein the photonic crystal structure is a cholesteric LC structure.

8. The polymer film according to claim 6, wherein the fluid is gas or liquid, and the liquid is an isotropic liquid or an anisotropic liquid.

9. The polymer film according to claim 8, wherein the isotropic liquid is a solvent, a monomer, or their combination.

10. The polymer film according to claim 9, wherein the monomer is capable of being polymerized.

11. The polymer film according to claim 6, which is connected to a light-permeable element.

12. The polymer film according to claim 6, which is configured in a solar cell element.

13. A multilayer structure optical film comprising a plurality of polymer films of claim 6, wherein the polymer films are manufactured from imprinting left-handed and right-handed cholesteric liquid crystals respectively.

* * * * *